United States Patent [19]

Hwang

[11] Patent Number: 5,278,995
[45] Date of Patent: Jan. 11, 1994

[54] RADIO CALLING METHOD OF A PORTABLE RADIO PHONE PROVIDING POWER CONSERVATION FUNCTIONS

[75] Inventor: Eun-Seob Hwang, Taegu, Rep. of Korea

[73] Assignee: SamSung Electronics Co. Ltd., Suwon, Rep. of Korea

[21] Appl. No.: 636,217

[22] Filed: Dec. 31, 1990

[30] Foreign Application Priority Data

Aug. 9, 1990 [KR] Rep. of Korea ............... 1990-12205

[51] Int. Cl.[5] .............................................. H04B 1/16
[52] U.S. Cl. ........................................ 455/127; 455/89; 455/343; 379/58
[58] Field of Search .............. 455/127, 89, 343; 379/58, 57, 61, 63; 340/825.44

[56] References Cited

U.S. PATENT DOCUMENTS 4,761,824  8/1988  Saito .................................. 455/127
5,117,449  5/1992  Metroka et al. ....................... 379/58

Primary Examiner—Reinhard J. Eisenzopf
Assistant Examiner—Chi Pham
Attorney, Agent, or Firm—Robert E. Bushnell

[57] ABSTRACT

There is disclosed a radio calling method of a portable radiophone comprising the steps of checking the power supply to determine whether the voltage of the power supply is below the level necessary to transmit signals, beeping and displaying "Only Receive" on the LCD when the voltage is below the level, connecting the power supply to the receiver, setting a given parameter "N" to I, analyzing a received paging signal to determine whether the calling number is an identified number, beeping and displaying "N Called" on the LCD if the calling number proves the identified number, making an increment of "N", checking whether the power supply has been restored, returning the procedure to the step of analyzing a received paging signal if the power supply is not restored or the calling number does not prove the identified number, and clearing the value of the parameter "N" when the power supply is restored.

16 Claims, 2 Drawing Sheets

RADIO CALLING METHOD OF A PORTABLE RADIO PHONE PROVIDING POWER CONSERVATION FUNCTIONS

BACKGROUND OF THE INVENTION

The present invention concerns a method of using a portable radiophone as a radio calling device by employing the receiving function thereof, particularly when the battery for operating the radiophone is too depleted to transmit signals.

Generally, if the battery for operating the portable radiophone is too depleted to transmit signals, the radiophone indicates that the battery should be replaced. If the battery is not replaced, the radiophone can not transmit and thus becomes completely useless.

SUMMARY OF THE INVENTION

The object of the present invention is to provide a method for enabling a portable radiophone to make a beep and display a message when there is an incoming call by employing its receiving function, when the battery is too depleted to transmit signals.

According to the present invention, there is provided a radio calling method of a portable radiophone comprising the steps of checking the power supply to determine whether the voltage of a power supply is below the level for transmission of signals, beeping and displaying "Only Receive" on the LCD when that voltage is below the level, connecting the power supply to the receiver, setting a given parameter N to I, analyzing a received paging signal to determine whether the calling number proves an identified number, beeping and displaying "N Called" on the LCD if the calling number proves the identified number, making an increment of the parameter "N", checking whether the power supply has been restored, returning the procedure to the step of analyzing a received paging signal if the power supply is not restored or the calling number does not prove the identified number, and clearing the value of the parameter "N" when the power supply is restored.

The present invention will now be described more specifically with reference to the drawings attached.

BRIEF DESCRIPTION OF THE ATTACHED DRAWINGS

DETAILED DESCRIPTION OF THE PREFERRED EMBODIMENT

Figure 2:
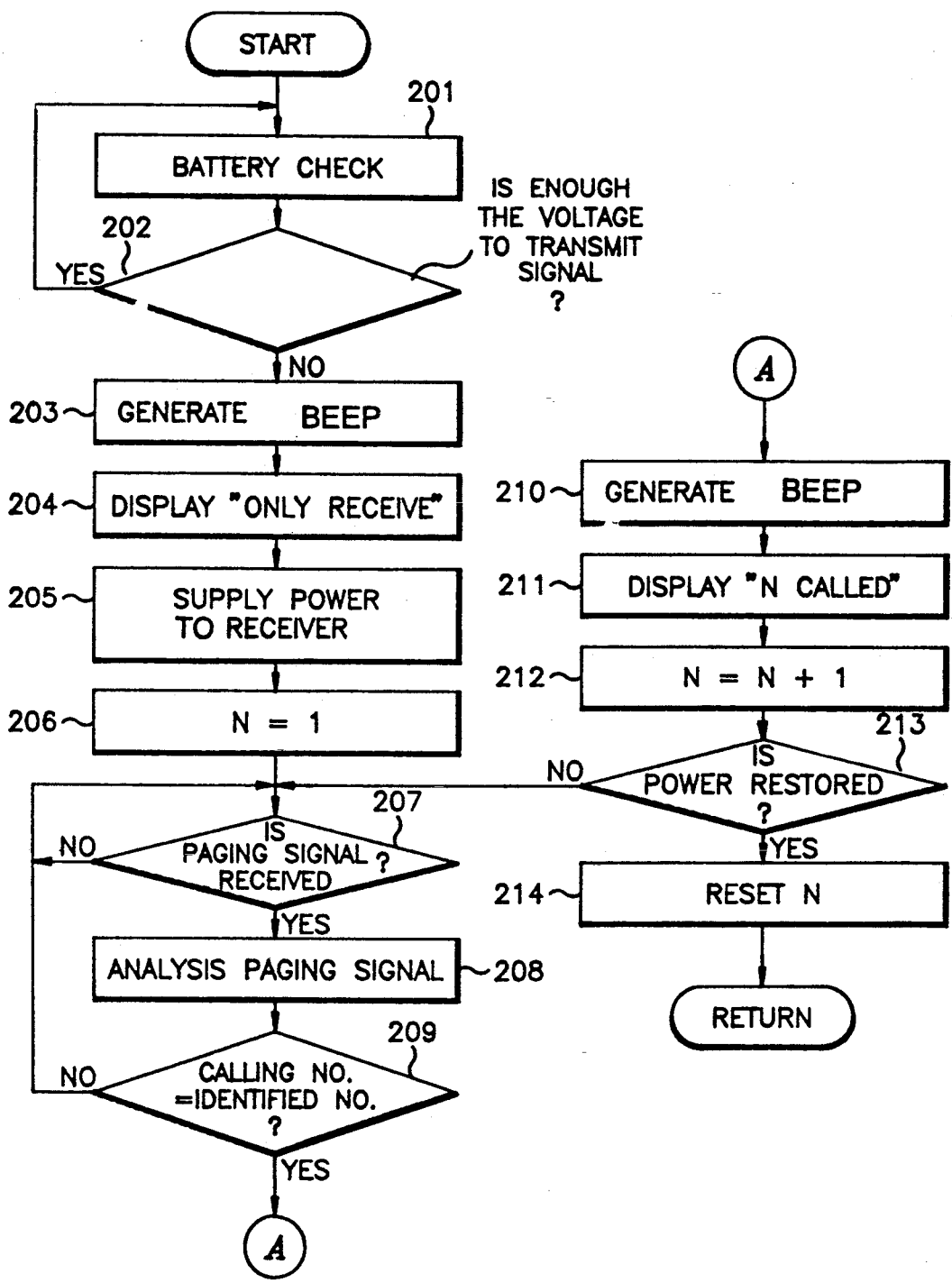
FIG. 2 is a flow chart for illustrating the present invention.

Referring to FIG. 2, the inventive method comprises the steps of checking the power supply (201) to determine whether the voltage of the power supply is below the level necessary to transmit signals, (202) beeping (203) and displaying "Only Receive" on the LCD (204) when that voltage is below the level, connecting the power supply to the receiver, (205) setting a given parameter "N" to I (206), analyzing a received paging signal (207-208) to determine whether the calling number is an identified number, 209 beeping (210) and displaying "N Called" on the LCD (211) if the calling number proves the identified number, making an increment of the parameter "N", (212) checking whether the power supply has been restored, (213) returning the procedure to the step of analyzing a received paging signal (207) if the power supply is not restored or the calling number does not prove the identified number, and clearing the value of the parameter "N" (214) when the power supply is restored.

Figure 1:
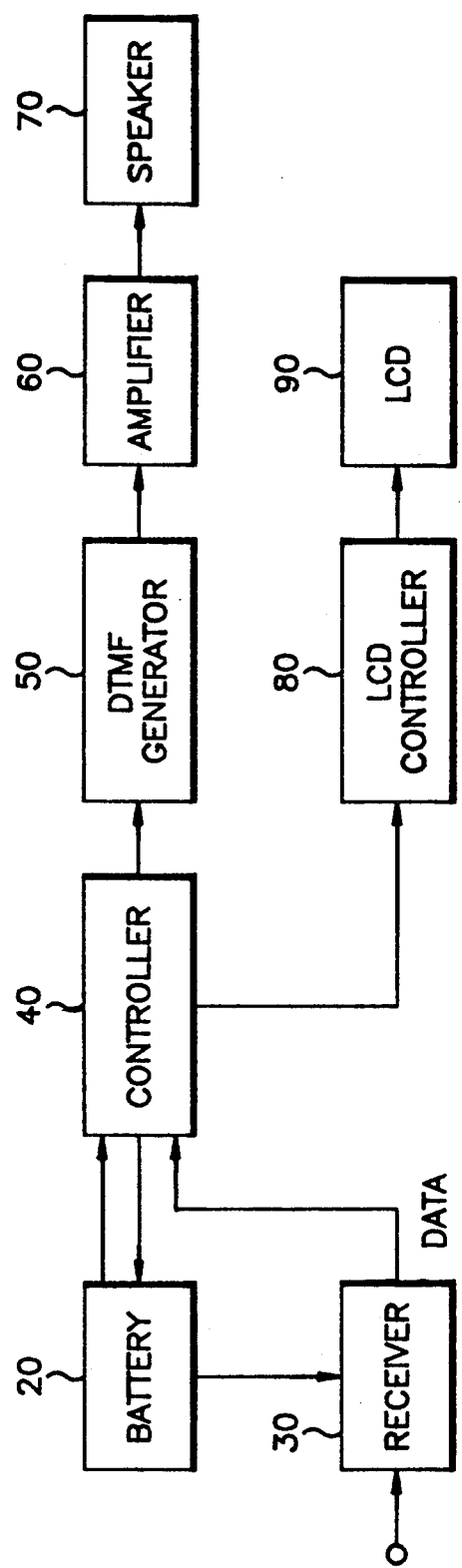
FIG. 1 is a block diagram illustrating the present invention.

Referring to FIG. 1, the controller (40) keeps on checking the power supply (20) to determine whether the power supply is high enough to transmit signals. If the power supply drops below the voltage level necessary to transmit signals, the controller (40) signals the dual tone multi-frequency generator ,(DTMF) (50) to generate a beep through the amplifier (60) and the speaker (70). In addition, the controller (40) signals the LCD controller (80) to cause the LCD to display the message "Only Receive", and signals the power supply (20) to only provide the receiver.

Further, the controller (40) sets the parameter "N" to I, and checks the paging signal received through the receiver (30). If receiving a paging signal through the receiver (30), the controller (40) analyzes the paging signal to determine whether the calling number is its identified telephone number. If the calling number is the identified number, the controller signals a beep and displays "N Called" on the LCD (90). Meanwhile, the controller (40) makes an increment of the parameter "N" whether the power supply has been restored. If the power supply is restored, the parameter "N" is cleared Otherwise, the procedure returns to the step of analyzing a received paging signal.

As stated above, the present invention provides a method for enabling a portable radiophone to beep and display a with message when there is an incoming call by employing the receiving function thereof when the battery is too depleted to transmit signals.

What is claimed is:

1. A radio calling method of a portable radiophone, comprising the steps of:
    checking a voltage of a power supply of the radiophone to decide whether the voltage of the power supply is below a level for transmission of signals by the radiophone;
    if said voltage is not below said level for transmission of signals, repeating said step of checking the voltage;
    providing an indication of a receive-only mode of the radiophone when said voltage is below said level;
    supplying said voltage to a receiver of the radiophone when said voltage is one of below, identical to and above said level;
    preventing transmission of signals from the radiophone by not supplying said voltage for the transmission of signals when said voltage is below said level;
    receiving a call in the receiver,
    determining whether said voltage of said power supply is below said level;
    returning to the step of receiving the call when said voltage of said power supply is below said level; and
    returning to the step of checking the voltage when said voltage is not below said level.

2. The radio calling method as set forth in claim 1, wherein said providing step comprises providing aid indication by generating one of an audible tone and a visual display of the receive-only mode.

3. The radio calling method as set forth in claim 1, wherein said receiving step comprises generating an audible tone and a visual display representing a quantity of said calls received in the receiver.

4. The radio calling method as set forth in claim 3, wherein said quantity is set to one when the voltage of the power supply is below the level for transmission of signals, and is incremented by one as each said call is received.

5. A portable radiophone, comprising:
a receiver;
a power supply for supplying a voltage to said radiophone; and
controlling means for monitoring the voltage supplied by the power supply to regulate transmission of radio signals from the radiophone and reception of incoming radio signals by said radiophone via said receiver, said controlling means regulating said transmission of radio signals and said reception of incoming radio signals comprising the steps of:
checking whether the voltage of the power supply is below a reference level for transmission of radio signals from the radiophone;
if the voltage is not below said reference level, returning to the step of checking the voltage of said power supply;
supplying the voltage to said receiver of the radiophone for enabling reception of said incoming radio signals, and cutting off supply of said voltage to disable transmission of said radio signals when said voltage falls below said reference level;
making a determination of whether the received radio signals have a calling number identical to and identified number of the receiver;
indicating when said calling number is identical to said identified number of the receiver;
deciding whether the voltage of said power supply is not below said reference level;
returning to the step of making a determination when the voltage of said power supply is below said reference level; and
returning to the step of checking the voltage of said power supply when said voltage is not below said reference level.

6. The portable radiophone as set forth in claim 5, further comprising:
dual tone multi-frequency generator means for generating an audible tone while the voltage remains below said reference level in dependence upon reception of said incoming radio signals by said receiver while said voltage remains below said reference level; and
a liquid crystal display for displaying a message indicating a number of radiophone calls in a receive-only mode in dependence upon reception of said incoming radio signals while the voltage remains below said reference level.

7. A method conserving a power supply in a radiophone, said method comprising the steps of:
checking the power supply to determine whether a voltage of the power supply is below a reference level for enabling transmission of signals of the radiophone;
if said voltage is not below said reference level, returning to the step of checking the power supply;
supplying said voltage to a receiver of the radiophone for receiving signals when said voltage is one of below, identical to and above said reference level, and not supplying said voltage for enabling transmission of signals of the radiophone when said voltage is below said reference level;
making a determination of whether each received signal via said receiver has a calling number identical to an identified number of the receiver;
indicating when said calling number is identical to said identified number;
deciding whether said voltage of the power supply is not below said reference level;
returning to the step of making a determination when said voltage is below said reference level in the deciding step; and
returning to the step of checking the power supply when said voltage is not below said reference level in the deciding step.

8. The radio calling method as set forth in claim 7, wherein said step of supplying said voltage comprises indicating a receive-only mode of operation of the radiophone, while the voltage of the power supply remains below said reference level, by providing one of an audible tone and a visual display indicative of said receive-only mode of operation.

9. The radio calling method as set forth in claim 7, wherein said indicating step comprises generating an audible tone, and generating a visual display of a message representing a quantity of said each received signal having the calling number identical to the identified number.

10. The radio calling method as set forth in claim 9, wherein said quantity is initialized when the voltage of the power supply falls below the level for transmission of signals, and said quantity is incremented by one after the message has been displayed.

11. A method of a portable radiophone, comprising the steps of:
performing a first step by determining if a power supply voltage is above a level for transmitting a signal;
if the power supply voltage is above said level, repeating said first step;
performing a second step by indicating to a user that the power supply voltage is not above said level;
performing a third step by supplying said power supply voltage to a receiver when said power supply voltage is one of below, identical to and above said level;
performing a fourth step by setting a count value to one when said power supply voltage is below said level;
performing a fifth step by determining if a call signal of a call is being received;
if said call signal is not being received in the fifth step, repeating the fifth step;
when the power supply voltage is below said level, performing a sixth step by notifying the user of said call count value, said count value representing a number of said calls received, and notifying the user that said call signal is being received;
performing a seventh step by incrementing said count value by one when said power supply voltage is below said level;
performing an eighth step by determining if said power supply voltage is restored above said level;
if said power supply voltage is restored above said level in said eighth step, returning to said first step; and
if said power supply voltage is not restored to said level in said eighth step, returning to said fifth step.

12. The method of claim 11, wherein said second step comprises indicating to the user that the power supply voltage is not above said level by one of generating an audible tone and displaying a message.

13. The method of claim 11, wherein said sixth step comprises notifying the user of said count value by displaying said count value and notifying the user that said call signal is being received by generating an audible tone.

14. A power conservation system of a radiophone, comprising:
- a receiver for receiving incoming radio signals;
- a power supply for providing a voltage for enabling operation of said radiophone;
- control means for regulating transmission of radio signals from the radiophone and reception of incoming radio signals by the radiophone via said receiver, said control means comprising the steps of:
  - checking the voltage of said power supply to decide whether the voltage of said power supply is below a reference level for enabling transmission of said radio signals from the radiophone;
  - if the voltage of said power supply is not below said reference level for enabling transmission of said radio signals, repeating the step of checking the voltage;
  - providing an indication of a receive-only mode of the radiophone when the voltage of said power supply is below said reference level;
  - supplying said voltage to said receiver when said voltage is one of below, identical to and above said reference level;
  - preventing transmission of said radio signals from the radiophone by disabling supplying of said voltage for the transmission of said radio signals when said voltage is below said reference level;
  - receiving incoming radio signals representative of a call in the receiver;
  - determining whether said voltage of said power supply is below said reference level;
  - returning to the step of receiving the call when the voltage of said power supply is below said reference level; and
  - returning to the step of checking the voltage of said power supply when said voltage is not below said reference level.

15. The power conservation system of claim 14, further comprising means for notifying a user of a quantity of calls received by the receiver during a power saving mode in dependence upon reception of said incoming radio signals.

16. The power conservation system of claim 14, further comprising means for providing a visual display for notifying a user of a power-saving mode.

* * * * *

UNITED STATES PATENT AND TRADEMARK OFFICE
CERTIFICATE OF CORRECTION

PATENT NO. : 5,278,995
DATED : January 11, 1994
INVENTOR(S) : Eun-Seob Hwang

It is certified that error appears in the above-indentified patent and that said Letters Patent is hereby corrected as shown below:

```
Title page, item [57], Abstract, line 8, change "I" to --1--;
                                 line 31, change "I" to --1--;
                                 line 61, change "I" to --1--;

Column 2, line 17, change "I" to --1--;
         line 26, preceding "whether", insert --and checks--;
         line 27, after "cleared", insert period--.--;
```

Signed and Sealed this

First Day of November, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,278,995

DATED: January 11, 1994

INVENTOR(S) : Eun-Seob Hwang

It is certified that error appears in the above-identified patent and that said Letters Patent is hereby corrected as shown below:

Title page, item [57], Abstract: line 8, change "l" to 1--.
Column 1, line 31, change "l" to --1--.
          line 61, change "l" to --1--.
Column 2, line 17, change "l" to --1--.
          line 26, preceding "whether", insert --and checks--.
          line 27, after "cleared", insert period--.--.
          line 64, change "aid" to --said--.
Column 3, line 33, change "and" to --an--.
          line 57, after "method", insert --of--.
Column 4, line 56, preceding "count", delete "call".

This certificate supersedes Certificate of Correction issued November 1, 1994.

Signed and Sealed this

Thirty-first Day of December, 1996

Attest:

BRUCE LEHMAN

*Attesting Officer*     *Commissioner of Patents and Trademarks*